Nov. 3, 1953  A. RAPPL  2,657,415

WINDSHIELD WIPER

Filed Jan. 24, 1948

INVENTOR
Anton Rappl
BY
Bean, Brooks, Buckley & Bean.
ATTORNEYS

Patented Nov. 3, 1953

2,657,415

UNITED STATES PATENT OFFICE 2,657,415

WINDSHIELD WIPER

Anton Rappl, Eggertsville, N. Y., assignor to Trico Products Corporation, Buffalo, N. Y.

Application January 24, 1948, Serial No. 4,190

4 Claims. (Cl. 15—245)

1

This invention relates to the window cleaning art and more particularly to a squeegee or blade for wiping a motor vehicle windshield to maintain a field of vision therethrough. In its simplest form the well known wiping blade comprises a squeegee body of rubber, or the like, and a holder or support therefor. The rubber body is firmly gripped within a channeled holder and is thereby restrained from freely following the surface contour with a resultant impairment in wiping efficiency.

The object of the present invention is to provide a wiper which is practical in design and most efficient in operation. Further, the invention has for its aim to construct a wiper in a manner to accord the wiping or squeegee body a freedom of movement sufficient to enable it to readily and fully conform itself to the surface being wiped and at the same time to mount the body for assuming a proper relation with respect to its actuating arm for assuring the utmost efficiency.

Figure 1:
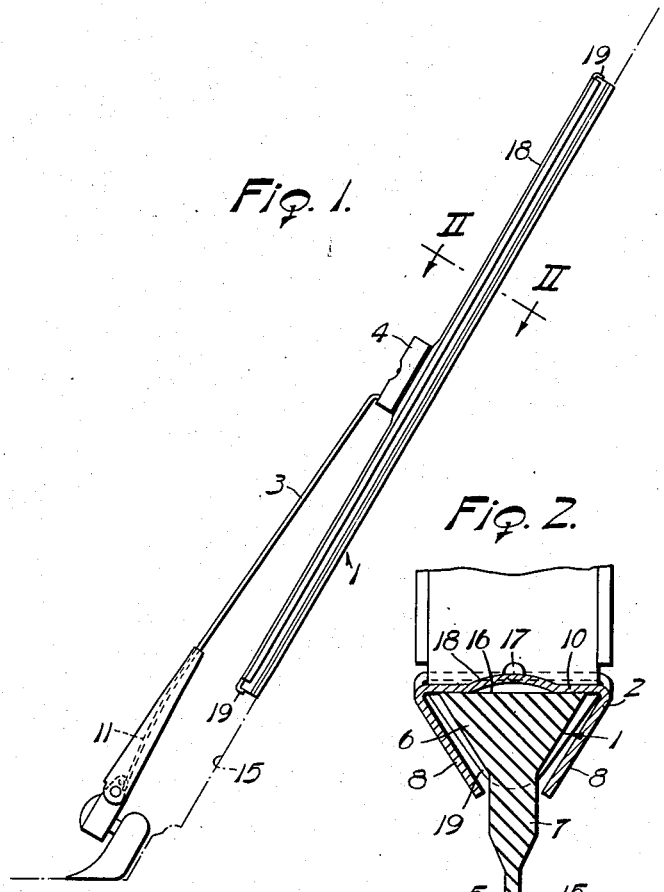
Figure 2:
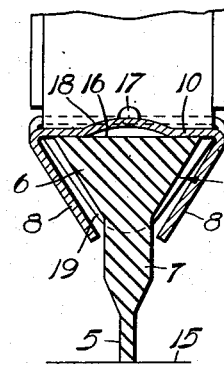
Figure 3:
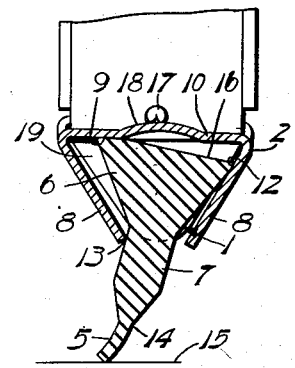
Figure 4:
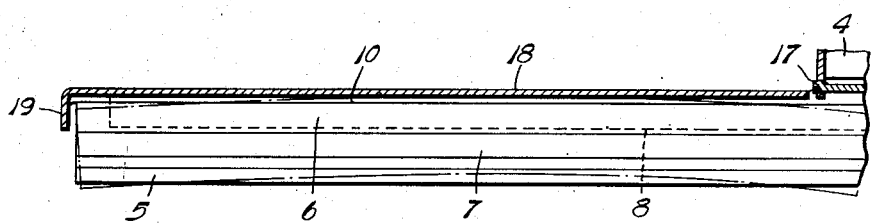

The foregoing and other objects will manifest themselves as the description progresses, reference being had to the accompanying drawing, wherein Fig. 1 is a side elevation of the improved wiper in its operative position;

Figs. 2 and 3 are cross sectional views taken about on line II—II of Fig. 1; and Fig. 4 is a fragmentary longitudinal view through the wiper.

Referring more particularly to the drawing, the numeral 1 designates the rubber wiping or squeegee body, the term rubber including any suitable material. This body is supported by a rigid holder 2 of channeled form. The holder is rockably attached to the actuating arm 3 by a clip 4 which enables the holder to rock about the wiping edge at the beginning of each stroke. In addition to this major or primary rocking movement imparted by the holder, the wiping body also has a secondary rocking movement which serves to enable a refined adjustment of its wiping edge 5 for insuring an accurate and even contact with the windshield surface throughout the length of the edge. To this end the wiping body is loosely disposed within the channel of the holder to float or move freely in a lateral direction.

The wiping body has an anchoring part 6, which is substantially triangular in cross section, and a web part 7, which depends from the anchoring portion and attenuates off to the relatively thinner wiping edge portion 5. The retaining flanges 8 of the channeled holder converge beneath the anchoring part 6 with sufficient clearance to enable the latter rocking back and forth within the holder channel to a limited extent.

The anchoring part and the web part 7 rock as a unit, and since this unit is loose within the holder channel it will be given a tri-point support by the holder, as shown in Fig. 3, wherein one longitudinal edge 9 of the anchoring part will engage the back or bottom wall 10 of the inverted holder channel to receive the arm pressure as provided by the arm spring 11. The opposite longitudinal upper edge 12 of the anchoring part will bear downwardly upon the forward one of the flanges 8 while the rear face of the web part 7 will engage the free edge of the companion flange, as at 13, so as to provide a braced mounting for the active wiping edge 5. The wiping edge, being relatively thinner with respect to its supporting web part 7, will readily flex about its line of attachment thereto, as indicated at 14, which line of attachment is disposed in proximity to the windshield surface 15. The wiping edge portion will therefore have a firm wiping contact with the windshield glass so that the desired wiping pressure will be controlled substantially to that of the arm spring. In other words, the arm spring pressure is brought down close to the wiping edge and is transmitted to the wiping contact through the relatively narrow flexible part of the wiping edge portion. The web part 7 will, of course, flex to a certain degree under abnormal conditions or above a predetermined arm pressure, but primarily the major flexing is confined to the wiping margin well out beyond the confining flanges 8. Since the squeegee body is elastic in character it will also be apparent that the three points of support, 9, 12 and 13, will be resilient or yieldable and therefore at the beginning of each wiping stroke the top face 16 of the anchoring part will initially seat fully upon the channel wall 10 as the holder rocks about its pivotal axis 17. Thereafter the squeegee body will turn over about its wiping edge and receive the cushioned tri-point support where it may yield as conditions require when the wiping edge is traversing its path of movement.

The holder may be strengthened by a longitudinal rib 18 pressed from its back wall 10 to provide a substantial backing for the squeegee body. This squeegee insert may be secured against longitudinal displacement by retaining stops 19 turned down at the opposite ends of the back wall.

By reason of the free and indefinite movement of the squeegee body within the holding member, the efficiency of the wiping action is greatly enlarged. This increased efficiency is attributed in part to the unrestrained mounting of the squeegee body within the channel and in part to the relatively narrow flexible margin which constitutes the wiping edge portion and to which the arm spring pressure is transmitted through the engagement 9 in a plane more or less directly over the wiping contact. The arm pressure is transmitted through the relatively rigid portion 6, 7 of the squeegee body to a point beyond the retaining flanges 8 and close to the actual wiping edge. The channeled holder conforms somewhat to the cross sectional shape of the anchoring part 6 and is therefore of substantially triangular shape in cross section. The three walls 8, 10, of the holder loosely embrace the triangular shaped anchoring part 6 of the squeegee body and the three lines of contact 9, 12 and 13 will shift from one holder wall to the other, respectively, at the beginning of each wiping stroke. It will be noted that the three lines of contact are cushioned to provide in effect a resilient tri-point support for the dragging squeegee body. The web is subject to flexure under abnormal pressure or when the wiping edge abnormally clings to the glass surface. By reason of the tri-point cushioned support the squeegee body will be provided a resilient floating mounting during the wiping stroke.

The foregoing description has been given in detail for clearness and without thought of limitation since the inventive principles involved are capable of assuming other physical embodiments without departing from the spirit of the invention and the scope of the appended claims.

What is claimed is:

1. A wiper comprising an elastic squeegee unit having an anchoring part with a depending web reduced at its free margin to provide a relatively flexible wiping edge, a holder for the squeegee unit having a flat bottom wall and opposing side flanges defining a channel and loosely embracing the anchoring part therein, the free edges of the flanges being spaced apart and freely receiving the web therebetween for alternate contact therewith, the anchoring part having a flat back face seating upon the flat wall with a normalizing full-face contact therewith and rocking laterally therefrom on one or the other of its two longitudinal edges, the face being of less width than the bottom wall for lateral play during the rocking motion to bring the other longitudinal edge into bearing contact with the forward one of the flanges with respect to the direction of travel to provide a torque-restraining tri-point support for the squeegee unit within the three walls of the channeled holder.

2. A squeegee comprising an elastic body of elongate design having an anchor part along one margin, said anchor part having a transversely broad flat normalizing back face and a web part relatively thinner than the anchor part and extending substantially normal to the normalizing back face with a wiping edge part along the opposite margin of the body extending from the web part and being independently flexible laterally thereon from adjacent its line of juncture with the web part, the wiping edge part being relatively thinner than its supporting web part, the back face extending laterally from the opposite sides of the wiping edge part, and a channeled holder for the squeegee loosely receiving the same and having a transversely flat wall portion on which the back face has rockable flat seating engagement acting thereon to normalize the squeegee when at rest on the surface being wiped, the side walls of the channeled holder being inturned beneath the anchoring part for alternate bearing contact by the opposite longitudinal margins of such part, the longitudinal free edges of the inturned side walls being spaced from the side faces of the thicker supporting web part for alternate contact therewith.

3. A wiper comprising an elongate flexible squeegee body of resilient material having a longitudinally extending anchoring part triangular in cross section and a relatively thinner web coextensive in length with the anchoring part and projecting from one longitudinal corner substantially normal to the opposite flat face to form a wiping edge, and a holder having a rigid channeled section with a flat bottom wall cooperating with the flat face to impart a normalizing urge to the squeegee body with respect to the surface being wiped, the sides of the channel extending over the sides of the anchoring part and terminating at opposite sides of the web for being alternately engaged thereby, the sides of the channel loosely confining the anchoring part within the channel for limited rotative motion substantially about the longitudinal axis of such anchoring part, the web and the remaining two corners of the anchoring part engageable with the bottom wall and sides of the holder to provide a torque-restraining tri-point support for the squeegee body when the wiper is moved sideways upon the surface.

4. A wiper according to claim 3 wherein the web has side faces that are substantially parallel with each other and at their outer margins are offset inwardly and in parallel relation to each other to form a relatively thinner wiping edge portion with relatively greater flexibility.

ANTON RAPPL.

References Cited in the file of this patent

UNITED STATES PATENTS

| Number | Name | Date |
| --- | --- | --- |
| 2,128,454 | Cullin | Aug. 30, 1938 |
| 2,179,451 | Horton | Nov. 7, 1939 |

FOREIGN PATENTS

| Number | Country | Date |
| --- | --- | --- |
| 504,083 | Great Britain | Apr. 19, 1939 |